UNITED STATES PATENT OFFICE.

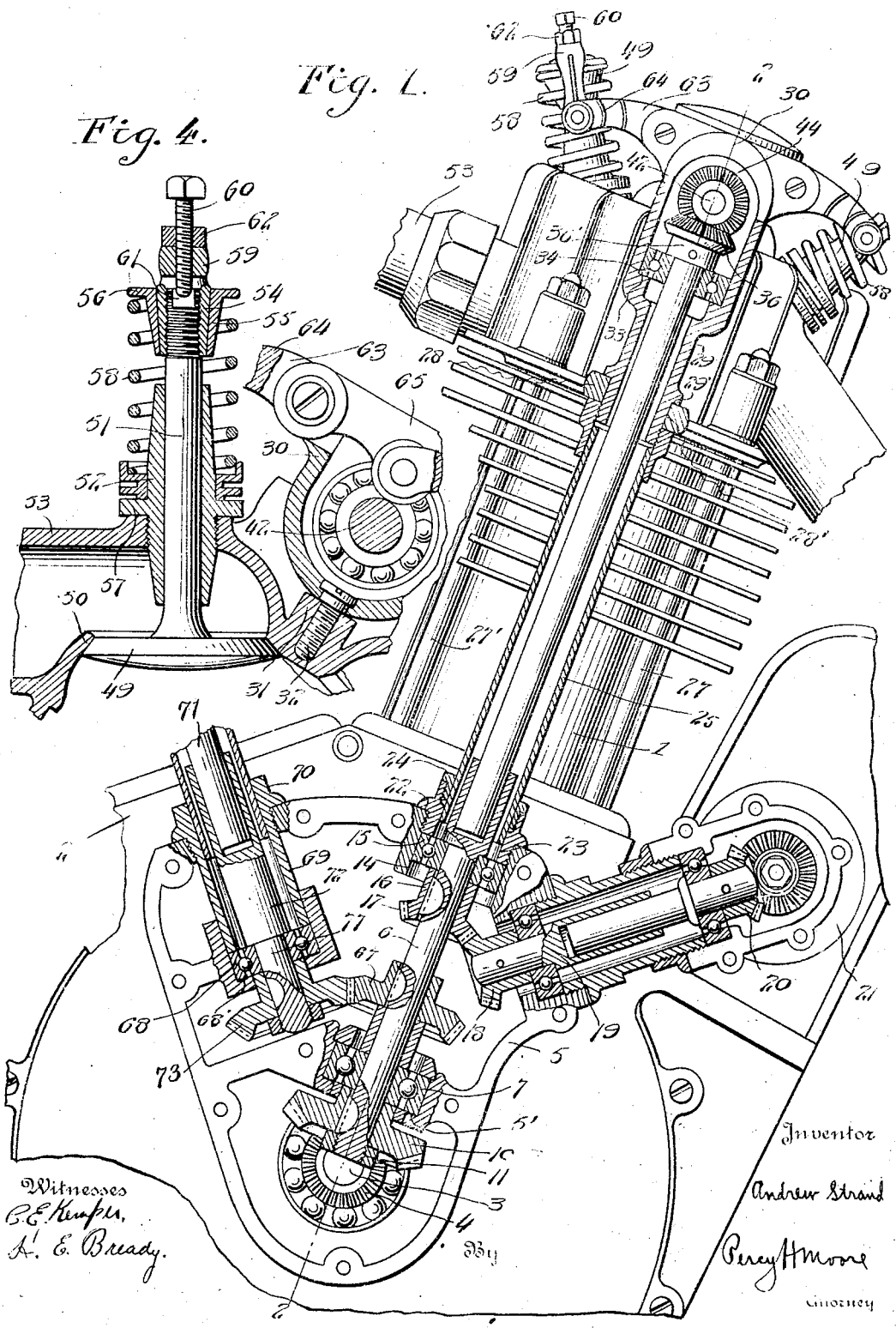

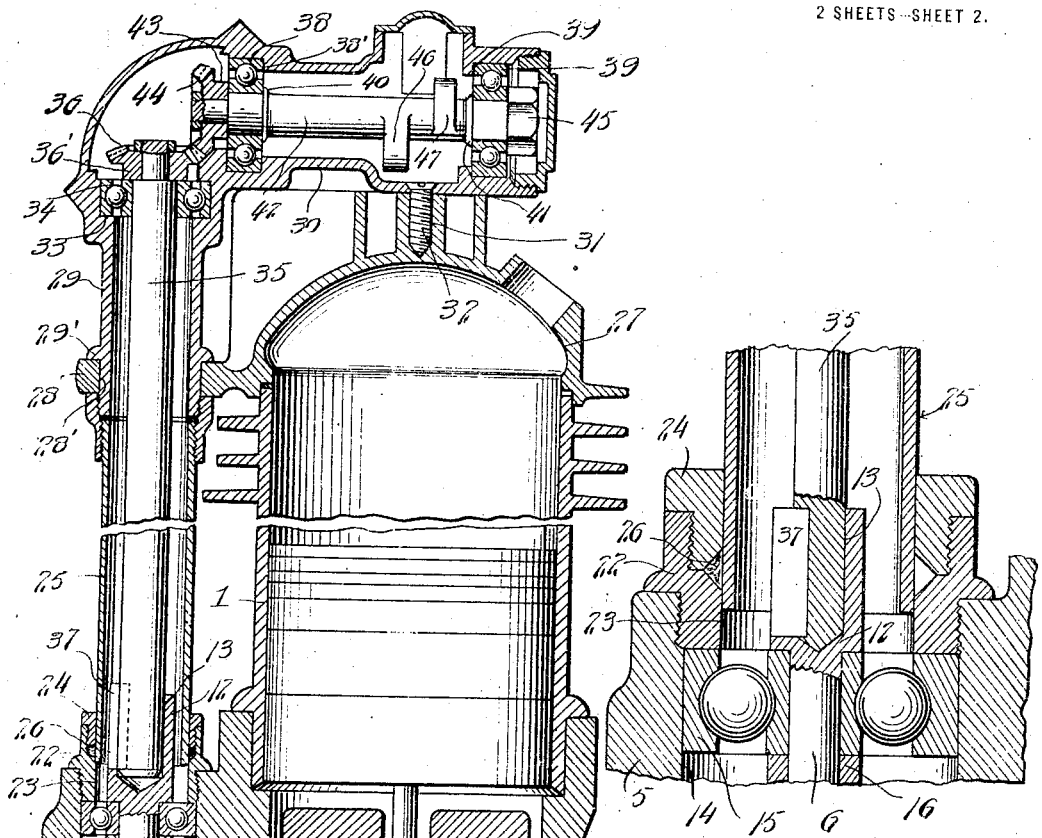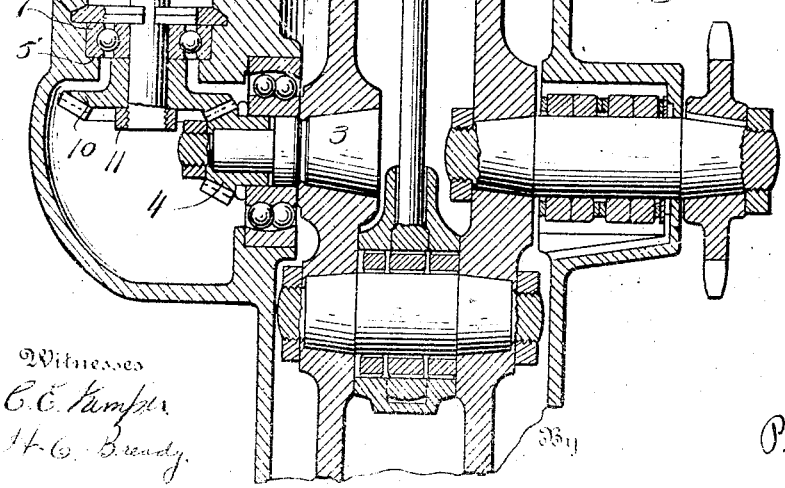

ANDREW STRAND, OF ST. PAUL, MINNESOTA, ASSIGNOR TO JOERNS MOTOR MANUFACTURING CO., OF ST. PAUL, MINNESOTA.

VALVE-OPERATING MECHANISM FOR GAS-ENGINES.

1,172,640.

Specification of Letters Patent.

Patented Feb. 22, 1916.

Application filed November 13, 1914. Serial No. 871,888.

*To all whom it may concern:*

Be it known that I, ANDREW STRAND, a citizen of the United States of America, residing at St. Paul, in the county of Ramsey and State of Minnesota, have invented certain new and useful Improvements in Valve-Operating Mechanism for Gas-Engines, of which the following is a specification.

My invention relates to valve operating mechanism for gas engines and more particularly for the type of engine commonly known in the art as the V type.

An object of my invention is the provision of means for lessening the frictional stress put upon the engine by the valve gear.

A further object is the elimination of all excess gearing in the valve mechanism.

Another object is the prevention of axial strain on the valve operating shafts.

A preferred form of my device is shown in the accompanying drawings in which:

Figure 1 is a front elevation partly in section of a portion of a V type engine, with my valve operating mechanism attached; Fig. 2 is a section on the line 2—2 of Fig. 1; Fig. 3 is a detail view of the joint in one of the operating shafts; and Fig. 4 is a detail view of the valve proper and its adjacent operating mechanism.

In the drawings and throughout the following description like characters denote like parts.

1 and 2 are the cylinders of the common V type engine the cylinder 2 being partly broken away. Within these cylinders are the usual pistons and connecting rods connecting said pistons with the crank shaft 3. Mounted upon one extremity of the crank shaft 3 and secured thereto is a bevel gear 4.

A shaft 6 axially parallel to the cylinder 1 is suitably mounted in a casing 5 having formed therein a shoulder 5'. Seated upon this shoulder 5' is a ball bearing 7, the inner face of said bearing being secured to shaft 6. To prevent the outer race from being forced upwardly from the shoulder 5' by any stress placed upon the shaft, I have formed above the same a groove 8 in which is placed an annular split ring 9.

Fixedly secured to the shaft 6 on the lower extremity thereof is a bevel gear 10 held in place by a nut 11 threaded on the shaft 6. This gear 10 meshes with the gear 4 on the crank shaft 3.

The shaft 6 is provided with an enlarged upper end 12 having an axial boring 13 provided therein for a purpose hereinafter to appear. Mounted in a circular opening 14 in the upper end of the casing is a second ball bearing 15 the inner race of which is held up against the shoulder on the shaft 6 formed by the enlargement 12, by the lengthened sleeve 16, of a bevel gear 17 keyed or otherwise secured to the shaft. This gear 17 through the medium of gear 18, shaft 19 and gear 20 drives a magneto 21. The upper portion of the opening 14 is provided with screw threads to receive a jam nut 22 provided with a central opening 23. This opening 23 is enlarged at its upper end and provided with screw threads to receive a second jam nut 24 also provided with a central opening. Into this latter opening the lower end of a casing 25 is tightly fitted, the lower extremity thereof extending slightly below the juncture of the jam nuts. At this juncture a groove is formed which is adapted to hold a packing gland 26.

The cylinder head 27 is made separate from the remainder of the cylinder and is secured thereto by any suitable means such as bolts 27'. An integral horizontal extension 28 formed on the cylinder is provided with a circular opening 28'. Mounted on this extension and having its lower extremity passing therethrough, is a vertical casing 29 having an annular shoulder 29' formed thereon which rests upon the edges of the opening 28'. The upper end 30 of the casing 29 is bent to the horizontal and extends over the cylinder head to which it is secured by means of a screw 32 extending through the casing into a vertical extension 31 of the head.

It will be seen that any expansion of the cylinder proper, due to heat when running, will cause a vertical movement of head 27 and casing 29, 30.

Seated in the casing 29 upon a shoulder 33 formed therein is a ball bearing 34. Mounted in this bearing 34 is a shaft 35 having a bevel gear 36 secured thereto by any suitable means, the sleeve 36' of the gear 36 resting upon the inner race of the bearing 34. The lower end of the shaft 35 is provided with a key 37 and is adapted to enter the axial boring 13 of the shaft 6, the key 37 engaging in a suitable slot.

It will thus be seen that the shafts 6 and 35 while coupled together for rotary movement are capable of a longitudinal adjustment. The upper end of the tube 25 is secured to the casing 29 in any suitable manner.

In the upper end 30 of the casing are seated ball bearings 38 and 39 having their outer races held against shoulders 38' and 39' respectively. Mounted in these bearings is a cam shaft 42, having shoulders 40 and 41 against which the inner races of the bearings abut. The inner race of the bearing 38 is held against the shoulder 40 by the sleeve 43 of the gear 44 which meshes with gear 36 on shaft 35. The inner race of the bearing 39 is held against the shoulder 41 by nut 45. The shaft is provided with cams 46 and 47.

In the head 37 are mounted the usual intake and exhaust valves 48 and 49 of similar construction, a detail view of one of which is shown in Fig. 4. In this view, the valve 49 is shown registering with its seat 50. The stem 51 of the valve is incased for nearly its entire length in a member 52 screw threaded into the exhaust outlet 53. The upper end of the stem 51 is screw threaded to receive a wedge shaped sleeve 54. A member 55 is provided surrounding said sleeve and having a shoulder 56. Between the shoulder 56 and a shoulder 57 on member 52 is disposed a compression spring 58 adapted to normally hold the valve on its seat. A saddle 59 straddles the upper end of the valve stem and has extending therethrough a set screw 60 which engages a notch 61 in the upper end of the stem. The set screw is held in position by a lock nut 62.

Pivotally mounted in the casing 30 is a lever 63 having forked ends 64 and 65, the former of which is pivotally connected to the lower extremities of the saddle 59 while the latter carries a bearing wheel 66 adapted to contact cam 46 and open the valve.

On the shaft 6 below the gear 17 is mounted a bevel gear 67. Seated upon a shoulder 68' in the casing 5 is a bearing 68 the outer race of which is held between the shoulder 68' and the sleeve like extension 69 of a jam nut 70. The inner race of the bearing which, it will be noted, supports the shaft 71, is held between an enlargement 72 on the shaft and a gear 73 secured to the lower end thereof which gear meshes with gear 67 on shaft 6. The upper portions of the shaft 71 and the overhead valve arrangement are identical with those already described on the cylinder 1.

Having now described my invention what I claim is:

1. In an internal combustion engine, a valve, the stem of said valve being notched and threaded at its upper end, a spring surrounding the stem and tending to hold said valve in closed position, a shouldered casing for the valve stem, a saddle, a set screw extending through said saddle, into said notch, a wedge shaped sleeve screwing onto said stem, a conical shaped shoulder member fitting over said sleeve, said spring engaging at opposite ends the shouldered casing and the shoulder on said conical member respectively, a pivoted lever, forked ends on said lever, a pivotal connection between the prongs on said end of said lever and the ears of said saddle, a wheel mounted between the prongs at the other end of said lever, a cam for contacting said wheel, and means for operating said cam.

2. In an internal combustion engine, a crank shaft, a gear mounted on said crank shaft, overhead valves on said cylinders, cam shafts for operating said valves, means for operating said cam shafts, comprising an upper and lower shaft said lower shaft having a gear meshing with the gear on said crank shaft, and provided with an enlarged hollow portion, said upper shaft slidably secured in said enlarged portion of said lower shaft, a second gear on said lower shaft, a gear on the lower end of the other of said multiple operating shafts adapted to mesh with said second gear, and a third gear on said lower shaft adapted to drive a magneto, as and for the purpose described.

In testimony whereof I affix my signature in presence of two witnesses.

ANDREW STRAND.

Witnesses:
JAC. BLEKKINK,
H. L. LISCHEN.